US012803341B2

(12) United States Patent
Saito et al.

(10) Patent No.: US 12,803,341 B2
(45) **Date of Patent: *Nov. 17, 2026**

(54) ROTARY ELECTRIC MACHINE HAVING CORES WITH REFERENCE MARKS

(71) Applicants: Sumitomo Electric Industries, Ltd., Osaka (JP); Sumitomo Electric Sintered Alloy, Ltd., Takahashi (JP)

(72) Inventors: Tatsuya Saito, Osaka (JP); Tomoyuki Ueno, Osaka (JP); Yuichi Nakamura, Osaka (JP)

(73) Assignees: SUMITOMO ELECTRIC INDUSTRIES, LTD., Osaka (JP); SUMITOMO ELECTRIC SINTERED ALLOY, LTD., Takahashi (JP)

( * ) Notice: Subject to any disclaimer, the term of this patent is extended or adjusted under 35 U.S.C. 154(b) by 113 days.

This patent is subject to a terminal disclaimer.

(21) Appl. No.: 18/827,908

(22) Filed: Sep. 9, 2024

(65) Prior Publication Data

US 2025/0007336 A1 Jan. 2, 2025

Related U.S. Application Data

(63) Continuation of application No. 17/638,202, filed as application No. PCT/JP2020/033850 on Sep. 8, 2020, now Pat. No. 12,119,707.

(30) Foreign Application Priority Data

Oct. 17, 2019 (JP) ................................ 2019-190556

(51) Int. Cl.

*H02K 1/14* (2006.01)
*H02K 16/04* (2006.01)
*H02K 21/24* (2006.01)

(52) U.S. Cl.

CPC ............. *H02K 1/146* (2013.01); *H02K 16/04* (2013.01); *H02K 21/24* (2013.01); *H02K 2213/03* (2013.01)

(58) Field of Classification Search

CPC ........... H02K 1/08; H02K 1/14; H02K 1/146; H02K 1/182; H02K 1/2793; H02K 1/2795; H02K 1/2796; H02K 21/24; H02K 16/04

See application file for complete search history.

(56) References Cited

U.S. PATENT DOCUMENTS

| | | | | |
|---|---|---|---|---|
| 12,119,707 B2 * | 10/2024 | Saito | ...................... | H02K 1/146 |
| 2010/0225195 A1 | 9/2010 | Asano et al. | | |

(Continued)

FOREIGN PATENT DOCUMENTS

| | | |
|---|---|---|
| JP | 55-56484 U | 4/1980 |
| JP | 2008-193842 A | 8/2008 |

(Continued)

OTHER PUBLICATIONS

Notice of Allowance mailed on Jun. 11, 2024, received for U.S. Appl. No. 17/638,202, 5 pages.

*Primary Examiner* — Eric Johnson

(74) *Attorney, Agent, or Firm* — XSENSUS LLP

(57) ABSTRACT

Provided is an axial gap-type rotary electric machine in which a first stator, a second stator, and a rotor are arranged in a direction of a rotary shaft of the rotor. The first stator includes a first coil and a first core. The second stator includes a second coil and a second core. The first core includes an annular first yoke, a plurality of first teeth, and a first mark indicating a reference position in a circumferential direction of the first yoke. The second core includes an annular second yoke, a plurality of second teeth, and a second mark indicating a reference position in a circumferential direction of the second yoke.

20 Claims, 11 Drawing Sheets

(56) References Cited

U.S. PATENT DOCUMENTS

| | | | | |
|---|---|---|---|---|
| 2011/0101813 | A1 | 5/2011 | Tbatou | |
| 2012/0104880 | A1* | 5/2012 | Takemoto ............ | H02K 1/2796 310/44 |
| 2018/0254687 | A1 | 9/2018 | Höber et al. | |
| 2018/0323663 | A1* | 11/2018 | Ogawa ................. | H02K 15/085 |
| 2019/0013708 | A1 | 1/2019 | Hattori et al. | |
| 2021/0296970 | A1 | 9/2021 | Crane et al. | |

FOREIGN PATENT DOCUMENTS

| | | | |
|---|---|---|---|
| JP | 2016-046940 | A | 4/2016 |
| JP | 2018-526958 | A | 9/2018 |
| WO | 2007/114079 | A1 | 10/2007 |

* cited by examiner

ROTARY ELECTRIC MACHINE HAVING CORES WITH REFERENCE MARKS

CROSS-REFERENCE TO RELATED APPLICATIONS

The present application is a continuation of U.S. patent application Ser. No. 17/638,202, filed on Feb. 25, 2022, which is based on PCT/JP2020/033850, filed on Sep. 8, 2020, which claims priority to Japanese Application No. 2019-190556, filed Oct. 17, 2019, the entire contents of each are incorporated herein by reference.

TECHNICAL FIELD

The present disclosure relates to a rotary electric machine.

BACKGROUND ART

As an axial gap-type rotary electric machine (motor/generator), a double stator-type rotary electric machine in which a rotor is sandwiched between a pair of stators is disclosed in FIG. 13 of PTL 1. Each of the stators includes a core on which coils are arranged. The core includes a yoke having a disc-like shape and a plurality of teeth protruding from a surface of the yoke. Each of the cores includes a yoke having a disc-like shape and a plurality of teeth protruding from a surface of the yoke. The coils are each arranged on the outer periphery of one of the teeth. In PTL 1, the core of the stator is formed by fitting columnar teeth into holes formed in the yoke. In contrast, the rotor is provided with a plurality of permanent magnets.

In an axial gap-type rotary electric machine that includes a pair of stators, one of the stators, the rotor, the other of the stators, are arranged in this order in the axial direction of a rotary shaft of the rotor. In this case, the two stators are positioned in such a manner that the teeth of the one stator face the teeth of the other stator.

CITATION LIST

Patent Literature

PTL 1: International Publication No. 2007/114079

SUMMARY OF INVENTION

A rotary electric machine of the present disclosure is an axial gap-type rotary electric machine in which a first stator, a second stator, and a rotor are arranged in a direction in which a rotary shaft of the rotor extends. The first stator includes a first coil and a first core formed of a dust core, the first coil being disposed on the first core, and the second stator includes a second coil and a second core formed of a dust core, the second coil being disposed on the second core. The first core includes an annular first yoke having a first yoke surface, a plurality of first teeth each protruding from the first yoke surface toward the rotor and being formed integrally with the first yoke, and a first mark indicating a reference position in a circumferential direction of the first yoke. The second core includes an annular second yoke having a second yoke surface, the second yoke surface facing the first yoke surface, a plurality of second teeth each protruding from the second yoke surface toward the rotor and being formed integrally with the second yoke, and a second mark indicating a reference position in a circumferential direction of the second yoke. When viewed in the direction in which the rotary shaft extends, the first mark and the second mark are symmetrically positioned with respect to the rotary shaft.

DESCRIPTION OF EMBODIMENTS

Figure 1:
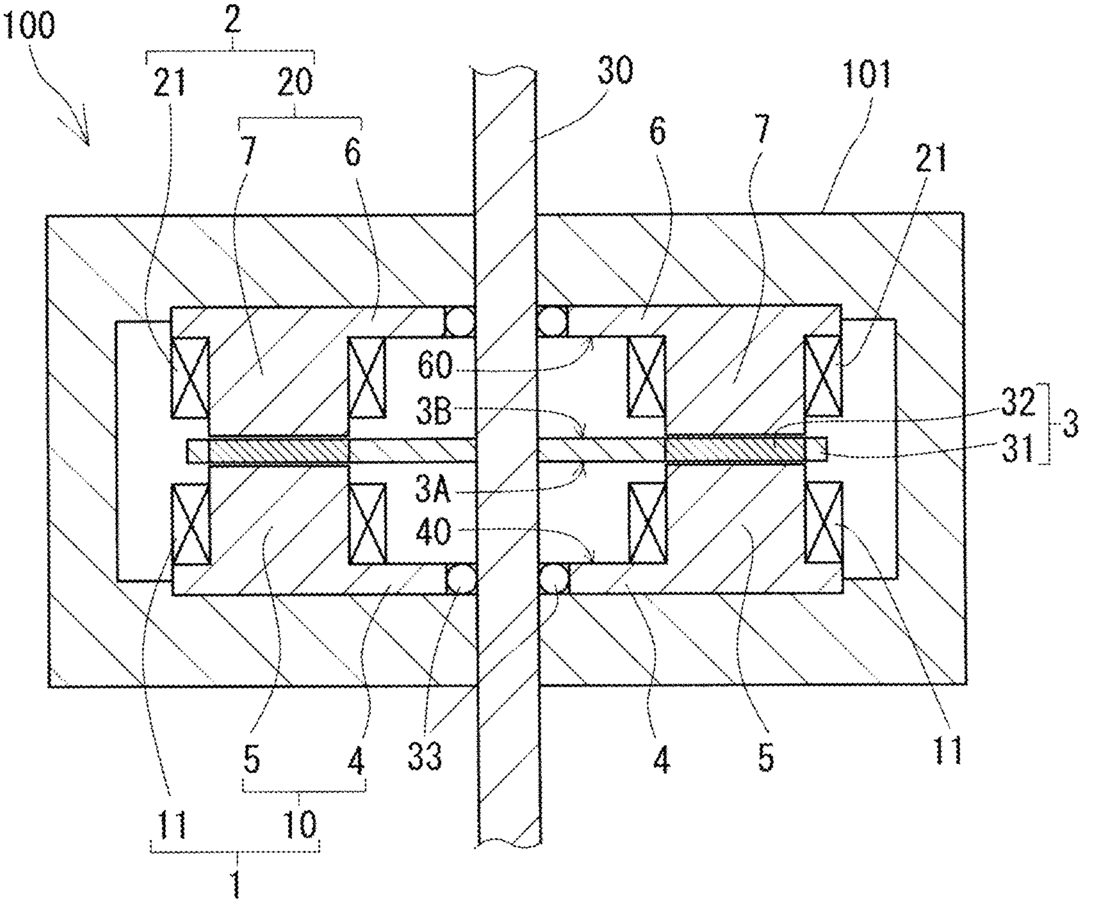
FIG. 1 is a partial vertical sectional view of an axial gap-type rotary electric machine of a first embodiment.

In PTL 1, the yoke and the teeth are fabricated separately, and they are combined together so as to fabricate the core of each of the stators. In this configuration, the productivity in manufacturing the rotary electric machine is not favorable because it takes time and effort to combine the yoke and the teeth.

In addition, with the configuration of PTL 1, protrusion heights of the teeth from the yoke are likely to vary. When there are variations in the protrusion heights of the teeth, an electromagnetic energy loss increases due to, for example, an increase in a torque ripple. Furthermore, the rotary shaft of the rotor is likely to move, and thus, a mechanical energy loss increases due to, for example, an increase in the frictional force generated between a shaft and a bearing.

Description of Embodiment of Present Disclosure

The inventors of the present disclosure conducted studies on using a dust core to form a core that includes a yoke and a plurality of teeth. In the case of fabricating a core formed of a dust core, compacting is performed by using a powder feeding machine so as to fill a die with a magnetic powder. A common powder feeding machine linearly reciprocates above a die so as to feed a powder to the die. Here, the inventors of the present disclosure have found that it is likely that the amount of the magnetic powder filled in a portion of the die that is located on the side on which a powder feeding operation is started is larger than the amount of the magnetic powder filled in a portion of the die that is located on the side on which the powder feeding machine starts moving backward. In addition, the inventors of the present disclosure have found that, when a straight line that passes through the center of the die viewed from the top surface and that extends along the direction in which the powder feeding machine reciprocates is defined as a powder feeding axis, portions of the die that are symmetrically positioned with respect to the powder feeding axis are likely to be filled with an approximately equal amount of the magnetic powder. In other words, in the core, which is formed of a dust core, the heights of the plurality of teeth included in the core are likely to gradually decrease from the side on which the powder feeding operation is started to the side on which the powder feeding machine starts moving backward. In addition, the teeth that are symmetrically positioned with respect to the powder feeding axis have substantially the same protrusion height. Based on these knowledges, the inventors of the present disclosure have completed the rotary electric machine according to the embodiment.

Aspects of the present disclosure will be listed and described below.

<1> A rotary electric machine according to an embodiment is an axial gap-type rotary electric machine in which a first stator, a second stator, and a rotor are arranged in a direction in which a rotary shaft of the rotor extends. The first stator includes a first coil and a first core formed of a dust core, the first coil being disposed on the first core, and the second stator includes a second coil and a second core formed of a dust core, the second coil being disposed on the second core. The first core includes an annular first yoke having a first yoke surface, a plurality of first teeth each protruding from the first yoke surface toward the rotor and being formed integrally with the first yoke, and a first mark indicating a reference position in a circumferential direction of the first yoke. The second core includes an annular second yoke having a second yoke surface, the second yoke surface facing the first yoke surface, a plurality of second teeth each protruding from the second yoke surface toward the rotor and being formed integrally with the second yoke, and a second mark indicating a reference position in a circumferential direction of the second yoke. When viewed in the direction in which the rotary shaft extends, the first mark and the second mark are symmetrically positioned with respect to the rotary shaft.

The above-described rotary electric machine has a favorable productivity. This is because the first core and the second core of the above-described rotary electric machine are each a dust core including a yoke and teeth that are integrally formed into one member, so that the process of combining the yoke and the teeth is omitted.

The above-described rotary electric machine has a favorable energy efficiency. In the above-described rotary electric machine, the plurality of pairs of teeth are formed. Each of the pair of teeth is a combination of one of the first teeth and one of the second teeth that are arranged at positions facing each other in the axial direction of the rotor. Here, the first mark and the second mark are symmetrically positioned with respect to the rotary shaft, and thus, intertooth distances in all the pairs of teeth are approximately equal to one another. As a result, the variation among the torques that are generated by the pairs of teeth at the respective positions in the circumferential direction of the rotor becomes small. In other words, the torque ripple in the above-described rotary electric machine is reduced. Thus, a magnetic energy loss in the above-described rotary electric machine is less likely to increase. In addition, since the torque ripple is small, the rotary shaft of the rotor is less likely to swing. In other words, the frictional force generated between the rotary shaft and a bearing is less likely to fluctuate. Therefore, it is presumed that a mechanical energy loss in the rotary electric machine is less likely to increase. Furthermore, since the torque ripple is small, noise and vibration of the rotary electric machine are reduced.

The reason why the intertooth distances in all the pairs of teeth become approximately equal to one another by symmetrically positioning the first mark and the second mark with respect to the rotary shaft of the rotor is that the protrusion heights of the teeth of the core, which is formed of a dust core, have line symmetry. If a double stator-type rotary electric machine is fabricated by combining the first core and the second core, each of which is formed of a dust core without considering the line symmetry, there is a possibility that the variation among the intertooth distances will become large.

The assembly of the above-described rotary electric machine can be easily performed. This is because the first core and the second core, which are included in the rotary electric machine, are provided with the first mark and the second mark, respectively. As an exemplary aspect, the first mark and the second mark each indicate one end side (the side on which a powder supply operation is started or the side on which the powder feeding machine starts moving backward) in the direction in which the powder feeding machine reciprocates. As another exemplary aspect, the first mark is provided at a position displaced from the above-mentioned one end by a predetermined length in the circumferential direction of the first yoke. As another exemplary aspect, the second mark is provided at a position displaced from the above-mentioned one end by a predetermined length in the circumferential direction of the second yoke. In both cases, by symmetrically positioning the first mark and the second mark with respect to the rotary shaft of the rotor, the first core and the second core are positioned with respect to each other such that the variation among the intertooth distances becomes small.

<2> As an exemplary aspect of the rotary electric machine according to the embodiment, when a virtual first reference straight line passing through the first mark and an axis of the first yoke when viewed in the axial direction of the first yoke is drawn on the first yoke, and a virtual second reference straight line passing through the second mark and an axis of the second yoke when viewed in the axial direction of the second yoke is drawn on the second yoke, a difference between a protrusion height of one of the plurality of first teeth and a protrusion height of another one of the plurality of first teeth, the one first tooth and the other first tooth being symmetrically positioned with respect to the first reference straight line, and each protrusion height being from the first yoke surface to an end surface of the corresponding first tooth, may be 0.15 mm or less, and a difference between a protrusion height of one of the plurality of second teeth and a protrusion height of another one of the plurality of second teeth, the one second tooth and the other second tooth being symmetrically positioned with respect to the second reference straight line, and each protrusion height being from the second yoke surface to an end surface of the corresponding second tooth, may be 0.15 mm or less.

The first reference straight line of the first core may be considered to coincide with the powder feeding axis, which is set at the time of fabricating the first core. In addition, the second reference straight line of the second core may be considered to coincide with the powder feeding axis, which is set at the time of fabricating the second core. The reference straight line of each of the cores can be determined by measuring the protrusion heights of the teeth of the core and comparing the protrusion heights. For example, assume the case of a core in which 12 teeth are arranged at 1 to 12 o'clock positions like a clock face. If the tooth that is located at the 12 o'clock position is the highest and the tooth that is located at the 6 o'clock position is the lowest, it can be surmised that a straight line connecting the 12 o'clock position and the 6 o'clock position is the reference straight line. In this case, the protrusion heights of the teeth that are symmetrically positioned with respect to the reference straight line are substantially the same as each other. For example, the height of the tooth that is located at the 1 o'clock position and the height of the tooth that is located at the 11 o'clock position are substantially the same as each other. In addition, the relationship among the heights of the teeth may be expressed as follows: tooth at 12 o'clock position>tooth at 1 o'clock (11 o'clock) position>tooth at 2 o'clock (10 o'clock) position>tooth at 3 o'clock (9 o'clock) position>tooth at 4 o'clock (8 o'clock) position>tooth at 5 o'clock (7 o'clock) position>tooth at 6 o'clock position. Thus, by symmetrically positioning the first mark and the second mark with respect to the rotary shaft of the rotor, the variation among the intertooth distances in all the pairs of teeth become very small.

<3> As an exemplary aspect of the rotary electric machine according to the embodiment, the first teeth and the second teeth may form a plurality of pairs of teeth in such a manner that each of the pair of teeth is formed of one of the first teeth and one of the second teeth arranged at positions facing each other in the direction in which a rotary shaft extends, and when a distance from a centroid of area of the end surface of the first tooth to a centroid of area of the end surface of the second tooth in each of the plurality of pairs of teeth is referred to as an intertooth distance, a difference between the largest intertooth distance and the smallest intertooth distance may be 0.08 mm or less.

The above-mentioned requirements indicate that the variation among the intertooth distances is 0.08 mm or less. In other words, in the rotary electric machine having the above-described configuration, it can be said that the intertooth distances in all the pairs of teeth are substantially the same as each other. Thus, the rotary electric machine has a favorable energy efficiency.

<4> As an exemplary aspect of the rotary electric machine according to the embodiment, in the first core, a variation among entire heights of the plurality of first teeth, each of the entire heights being a distance from a surface opposite to the first yoke surface to the end surface of the corresponding first teeth, may be 0.05 mm to 0.15 mm, and in the second core, a variation among entire heights of the plurality of second teeth, each of the entire heights being a distance from a surface opposite to the second yoke surface to the end surface of the corresponding second teeth, may be 0.05 mm to 0.15 mm.

As mentioned above, the heights of teeth in a core that is formed of a dust core are likely to vary. However, it is preferable that the variation be small. In the above-described configuration, the variation among the distances from the first teeth of the first core to the rotor is small, and the variation among the distances from the second teeth of the second core to the rotor is small. In other words, the variation among the torques obtained from the plurality of pairs of teeth that are arranged in the circumferential direction of the rotor becomes small, and thus, the torque ripple can be reduced. Therefore, according to the above-described configuration, the energy efficiency of the rotary electric machine can be improved.

<5> As an exemplary aspect of the rotary electric machine according to the embodiment, a variation among thicknesses of the first yoke may be 0.03 mm to 0.10 mm, and a variation among thicknesses of the second yoke may be 0.03 mm to 0.10 mm.

According to the above-described configuration, for a reason similar to that in the above-mentioned <4>, the energy efficiency of the rotary electric machine can be improved.

<6> As an exemplary aspect of the rotary electric machine according to the embodiment, a variation among protrusion heights of the plurality of first teeth may be 0.03 mm to 0.10 mm, and a variation among protrusion heights of the plurality of second teeth may be 0.03 mm to 0.10 mm.

According to the above-described configuration, for a reason similar to that in the above-mentioned <4>, the energy efficiency of the rotary electric machine can be improved.

<7> As an exemplary aspect of the rotary electric machine according to the embodiment, the rotor may have a first rotor surface facing the end surfaces of the first teeth and a second rotor surface facing the end surfaces of the second teeth. The variation among the entire heights of the plurality of first teeth, each of the entire heights being the distance from the surface opposite to the first yoke surface to the end surface of the corresponding first teeth, may be 20% or less of an average value of distances between the plurality of first teeth and the first rotor surface, and the variation among the entire heights of the plurality of second teeth, each of the entire heights being the distance from the surface opposite to the second yoke surface to the end surface of the corresponding second teeth, may be 20% or less of an average value of distances between the plurality of second teeth and the second rotor surface.

According to the above-described configuration, for a reason similar to that in the above-mentioned <4>, the energy efficiency of the rotary electric machine can be improved.

<8> As an exemplary aspect of the rotary electric machine according to the embodiment, the rotor may have a first rotor surface facing the end surfaces of the first teeth and a second rotor surface facing the end surfaces of the second teeth. The variation among thicknesses of the first yoke may be 2% or less of an average value of distances between the first yoke surface and the first rotor surface, and the variation among thicknesses of the second yoke may be 2% or less of an average value of distances between the second yoke surface and the second rotor surface.

According to the above-described configuration, the energy efficiency of the rotary electric machine can be improved.

<9> As an exemplary aspect of the rotary electric machine according to the embodiment, upon energization, an annular magnetic circuit that passes through the first core, the rotor, and the second core may be formed. The variation among the entire heights of the plurality of first teeth, each of the entire heights being the distance from the surface opposite to the first yoke surface to the end surface of the corresponding first teeth, may be 1% or less of a magnetic circuit length of the annular magnetic circuit, and the variation among the entire heights of the plurality of second teeth, each of the entire heights being the distance from the surface opposite to the second yoke surface to the end surface of the corresponding second teeth, may be 1% or less of the magnetic circuit length of the annular magnetic circuit.

According to the above-described configuration, the energy efficiency of the rotary electric machine can be improved. An example of the annular magnetic circuit will be described later in the embodiment, which will be described below.

Details of Embodiment of Present Disclosure

A specific example of a rotary electric machine according to an embodiment of the present disclosure will be described with reference to the drawings. In the drawings, components that are the same as each other or that correspond to each other are denoted by the same reference sign. Note that the present invention is not limited to the above exemplary aspects and is to be determined by the claims, and it is intended that meanings equivalent to the scope of the claims and all the modifications within the scope of the claims are included in the scope of the present invention.

First Embodiment 1

<<Rotary Electric Machine>>

In the first embodiment, an axial gap-type rotary electric machine 100 that is illustrated in FIG. 1 will be described as an example. The rotary electric machine 100 may be a generator or may be an electric motor (a motor). The rotary electric machine 100 includes a first stator 1, a second stator 2, and a rotor 3 that are arranged in a housing 101. The rotary electric machine 100 of the present embodiment is a 3-phase, 4-pole, 6-slot rotary electric machine 100. In other words, the rotary electric machine 100 uses a three-phase alternating current. The rotor 3 is provided with four magnets 32. The first stator 1 has six first teeth 5. The second stator 2 has six second teeth 7. Here, the number of phases and the number of poles (the number of magnets 32) of the alternating current are not particularly limited. In addition, the number of slots is not particularly limited as long as it is a multiple of the number of phases.

Rotor

The rotor 3 includes the plurality of magnets 32 each of which has a flat plate-like shape and an annular holding plate 31 that support the magnets 32. The holding plate 31 is fixed to a shaft 30 and rotates together with the shaft 30. The magnets 32 are embedded in the holding plate 31. The magnets 32 are arranged in such a manner as to be spaced apart from one another in the circumferential direction of the holding plate 31. In addition, the magnets 32 are magnetized in a direction in which a rotary shaft of the rotor 3 extends (the axial direction of the shaft 30). The magnetization directions of the magnets 32 that are adjacent to each other in the circumferential direction of the shaft 30 are opposite to each other.

First Stator

Figure 2:
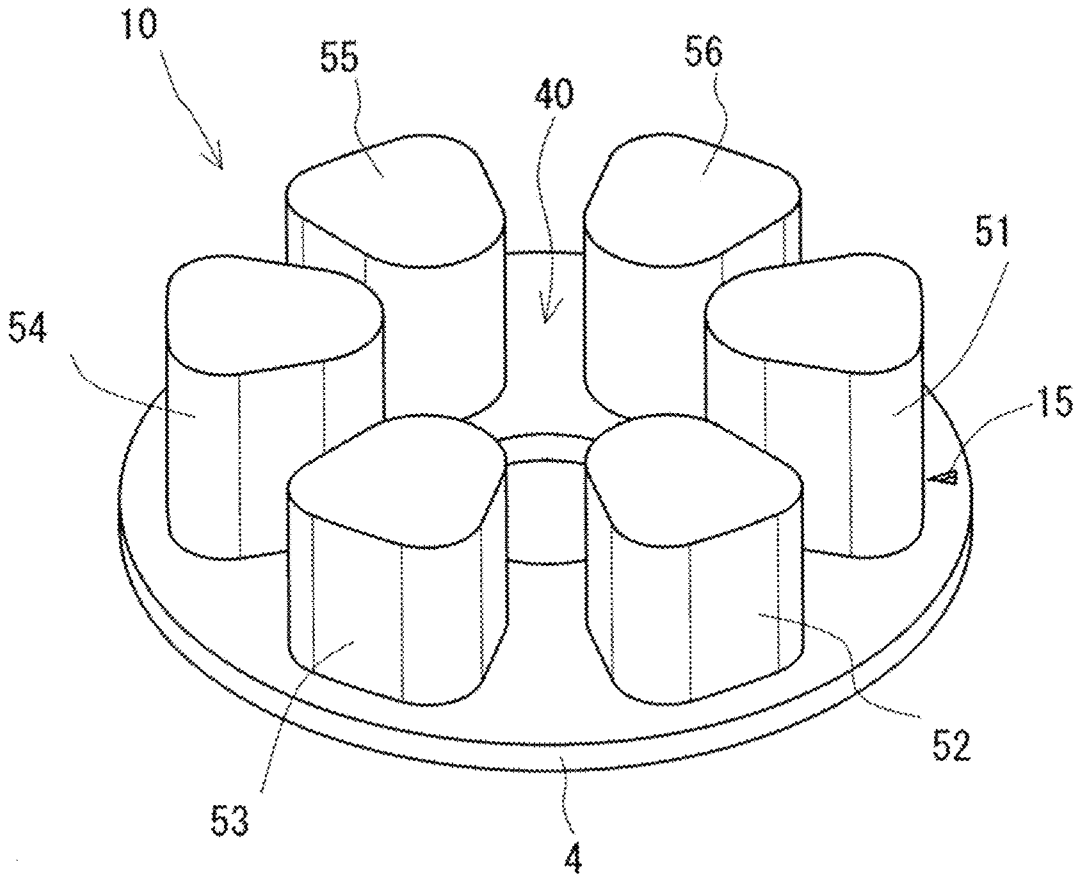
FIG. 2 is a perspective view of a first core of a first stator.

The first stator 1 includes a first core 10 and first coils 11. As illustrated in FIG. 2, which is the perspective view, and FIG. 3, which is the top view, the first core 10 includes a first yoke 4 that has an annular shape and the plurality of first teeth 5 each of which is formed in a columnar shape. The shape of each of the first teeth 5 is not particularly limited. For example, each of the first teeth 5 can have a substantially triangular columnar shape as illustrated in FIG. 2. Alternatively, the shape of each of the first teeth 5 may be a cylindrical shape, a quadrangular columnar shape, or the like. Here, in FIGS. 2 and 3, the reference signs "51" to "56" are given to the first teeth 5 in order to distinguish them from one another. All the first teeth 51 to 56 protrude from a first yoke surface 40 of the first yoke 4. The first yoke surface 40 is a surface facing a first rotor surface 3A of the rotor 3 illustrated in FIG. 1.

The dimensions of the first yoke 4 and the first teeth 5 can be suitably selected in accordance with characteristics required for the rotary electric machine 100. For example, the inner diameter of the first yoke 4 can be 10 mm to 100 mm, and the outer diameter of the first yoke 4 can be 20 mm to 120 mm. In addition, the protrusion height of each of the first teeth 5, which is the distance from the first yoke surface 40 to an end surface of each of the first tooth 5, can be 2 mm to 40 mm, and the area of a cross section of each of the first teeth 5, the cross section being perpendicular to the protrusion height, can be 10 $mm^2$ to 800 $mm^2$.

In the rotary electric machine 100 (FIG. 1) of the present embodiment, which uses the three-phase alternating current, the U-phase first coils 11 (FIG. 1) are wound around the first tooth 51 and the first tooth 54. The V-phase first coils 11 are wound around the first tooth 52 and the first tooth 55, and the W-phase first coils 11 are wound around the first tooth 53 and the first tooth 56.

The first core 10 is a dust core that is obtained by compacting a magnetic powder. An example of a soft magnetic powder is at least one type of powder selected from the group consisting of pure iron (having a purity of 99% by mass or more) and iron-based alloys such as Fe—Si—Al alloy (sendust), Fe—Si alloy (silicon steel), Fe—Al alloy, and Fe—Ni alloy (permalloy). It is preferable that soft magnetic particles have an insulating coating on their surfaces. As a result of the insulating coating being formed on the surface of each soft magnetic particle, electrical insulation between the soft magnetic particles can be ensured. Examples of the insulating coating include a phosphate coating and a silica coating.

In the first core 10, which is formed of a dust core, the heights of the first teeth 5 are likely to vary. However, the way in which the heights of the first teeth 5 vary follows a certain rule. This pattern depends on a method of fabricating the first core 10. Accordingly, an example of the method of fabricating the first core 10 will now be described with reference to FIGS. 5 and 6.

Figure 5:
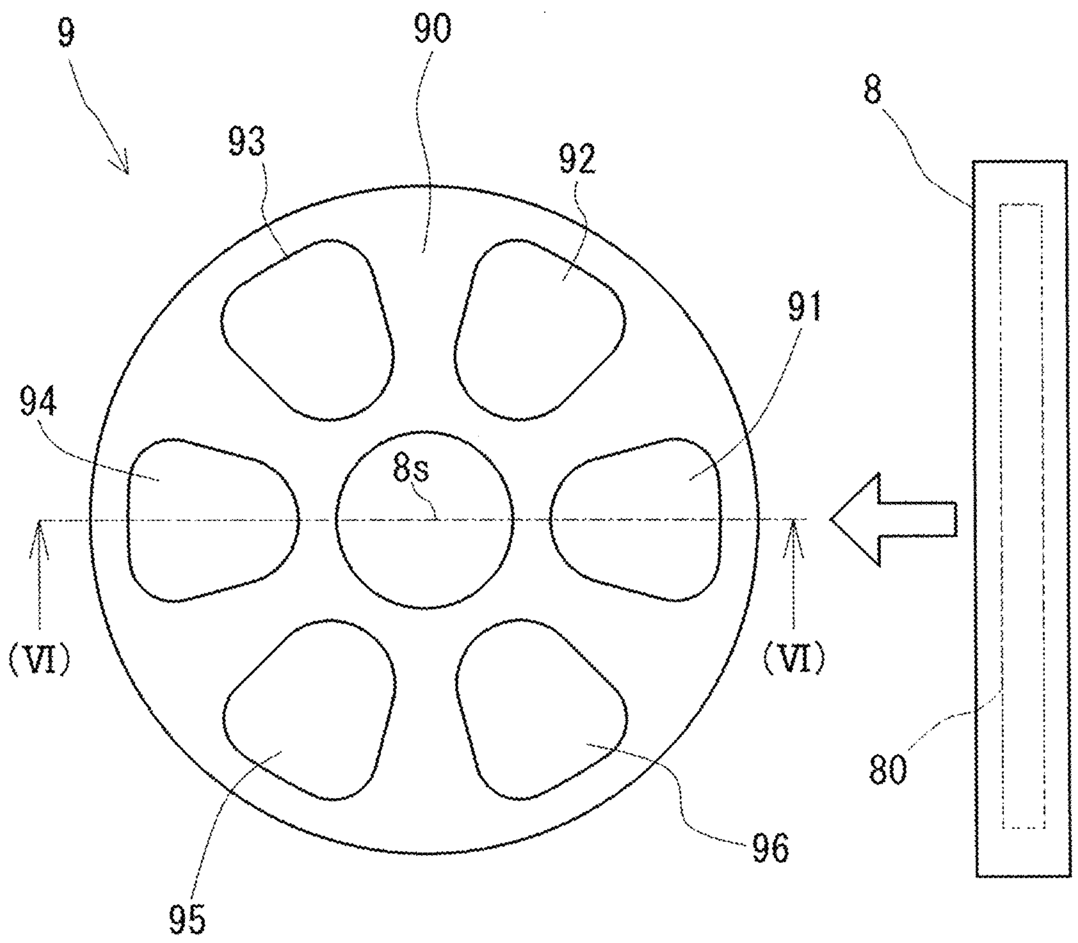
FIG. 5 is a schematic diagram illustrating the positional relationship between a die that is used for fabricating first teeth and a powder feeding machine.
Figure 6:
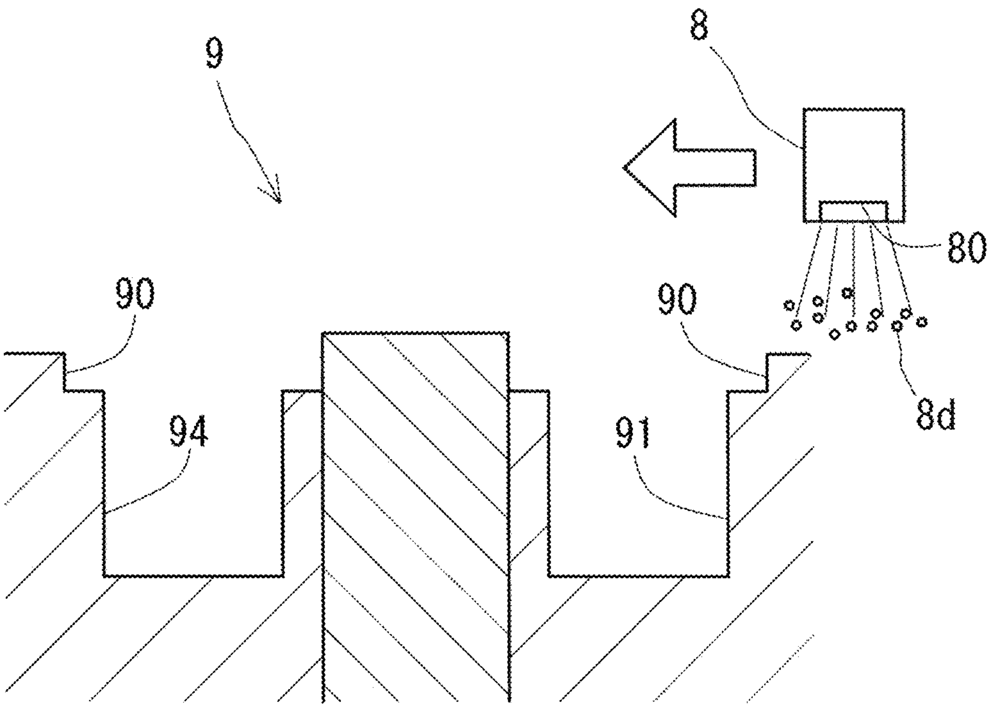
FIG. 6 is a sectional view taken along line VI-VI of FIG. 5.

FIG. 5 is a diagram illustrating a die 9 that is used for fabricating the first core 10 and a powder feeding machine 8 that feeds the magnetic powder to the die 9 when viewed from their top surfaces. FIG. 6 is a sectional view taken along line VI-VI of FIG. 5. The die 9 includes a yoke forming portion 90 that is a recess formed in the top surface thereof and tooth forming portions 91 to 96 each of which is a recess formed in the bottom surface of the yoke forming portion 90. The yoke forming portion 90 is a die that corresponds to the first yoke 4 illustrated in FIG. 2 and FIG. 3. The tooth forming portions 91 to 96 are each a die that corresponds to one of the first teeth 51 to 56 illustrated in FIG. 2 and FIG. 3. For example, the tooth forming portion 91 is a die of the first tooth 51, and the tooth forming portion 92 is a die of the first tooth 52.

The powder feeding machine 8 moves in the radial direction of the die 9. For example, as indicated by an outlined arrow, the powder feeding machine 8 moves from the side on which the tooth forming portion 91 is present to the side on which the tooth forming portion 94 is present so as to feed the magnetic powder 8*d* into the die 9. The powder feeding machine 8 has a powder feed port 80 that is wide and that extends in a direction perpendicular to the direction of movement of the powder feeding machine 8. The width (the length in the vertical direction in FIG. 5) of the powder feed port 80 is equal to or larger than the width of an opening of the yoke forming portion 90. A powder feeding operation may be performed only on a forward-movement path that is indicated by the outlined arrow or may be performed both on the forward-movement path and on a backward-movement path (in a direction opposite to the direction indicated by the outlined arrow).

In the case of using the powder feeding machine 8 that linearly moves above the die 9, a difference in the filling amount of a magnetic powder 8*d* is likely to occur among the tooth forming portions 91 to 96. More specifically, for example, when the magnetic powder 8*d* has high fluidity, it is likely that the amount of the magnetic powder 8*d* filled in a portion of the die 9 that is located on the side on which the powder feeding operation is started (the right-hand side as viewed in FIG. 5) is larger than the amount of the magnetic powder 8*d* filled in a portion of the die 9 that is located on the side on which the powder feeding machine 8 starts moving backward (the left-hand side as viewed in FIG. 5). In the case illustrated in FIG. 5, the tooth forming portion 91 is likely to be filled with a large amount of the magnetic powder 8*d*, and the filling amount of the magnetic powder 8*d* decreases as the powder feeding machine 8 moves closer to the tooth forming portion 94. In addition, when a straight line that passes through the center of the die 9 illustrated in FIG. 5 and that extends along the direction in which the powder feeding machine 8 reciprocates is defined as a powder feeding axis 8*s*, the tooth forming portions 92 and 96 that are symmetrically positioned with respect to the powder feeding axis 8*s* are likely to be filled with an approximately equal amount of the magnetic powder 8*d*. Similarly, the tooth forming portions 93 and 95 that are symmetrically positioned with respect to the powder feeding axis 8*s* are likely to be filled with an approximately equal amount of the magnetic powder 8*d*. In other words, the filling amount of the magnetic powder 8*d* may be expressed as tooth forming portion 91>tooth forming portion 92, 96>tooth forming portion 93, 95>tooth forming portion 94.

In the case illustrated in FIG. 5, the powder feeding axis 8*s* is set to pass through the tooth forming portions 91 and 94. Unlike the case illustrated in FIG. 5, the powder feeding axis 8*s* may be set to pass through the yoke forming portion 90. For example, the powder feeding axis 8*s* may be set to pass between the tooth forming portions 91 and 92 and between the tooth forming portions 94 and 95. In this case, the filling amount of the magnetic powder 8*d* may be expressed as tooth forming portion 91, 92>tooth forming portion 93, 96>tooth forming portion 94, 95.

Figure 3:
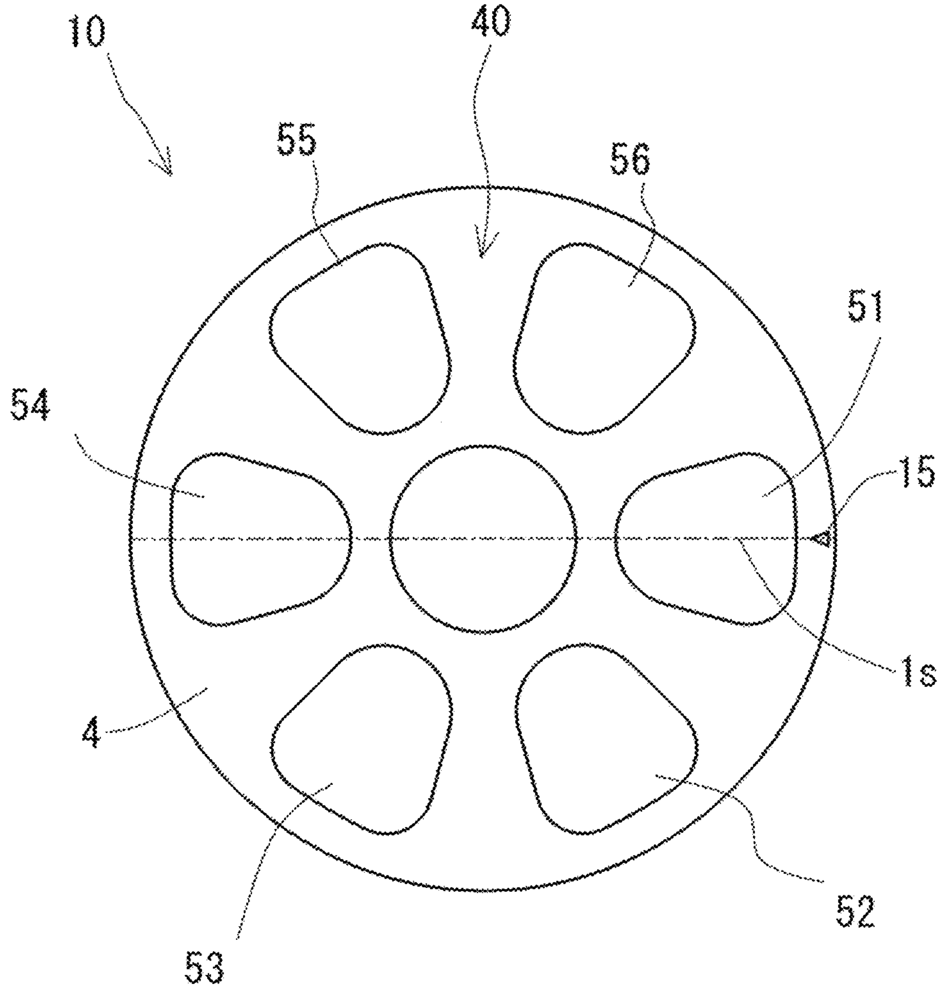
FIG. 3 is a top view of the first core of the first stator.
Figure 7:
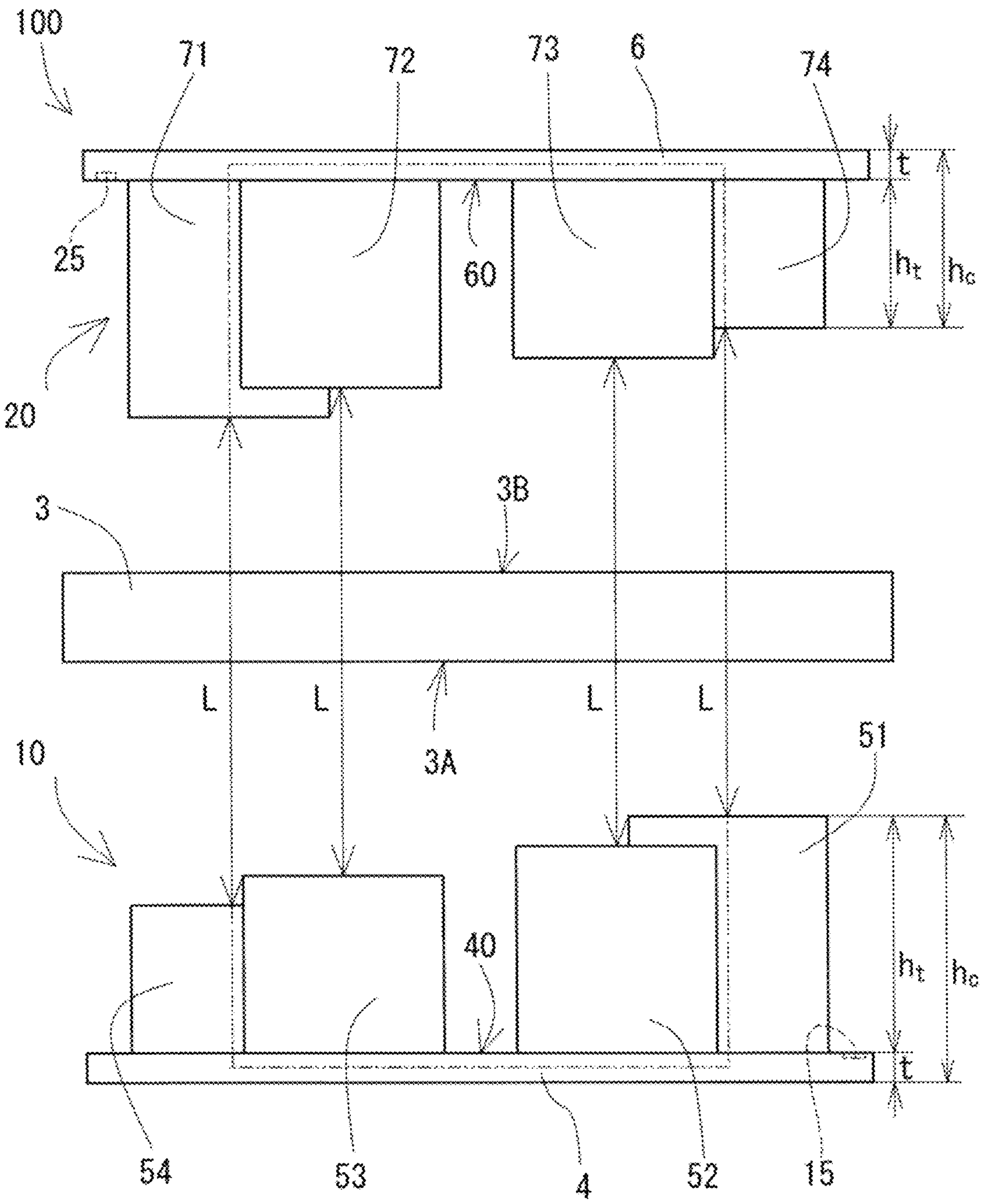
FIG. 7 is a schematic diagram of the positional relationship among the first teeth, second teeth, and a rotor.

As described above, in the case of using the powder feeding machine 8 that linearly moves, the filling amount of the magnetic powder in the die 9 is likely to have line symmetry with respect to the powder feeding axis 8*s* serving as the axis of symmetry. Thus, the protrusion heights (the lengths in the axial direction of the first yoke 4) of the first teeth 51 to 56 of the first core 10, which is fabricated by using the die 9 and which is illustrated in FIGS. 2 and 3, also have line symmetry. In other words, a virtual first reference straight line is that corresponds to the powder feeding axis 8*s* (FIG. 5), which is set at the time of fabricating the first core 10, can be drawn on the first core 10. The first reference straight line 1*s* is a straight line that passes through the axis of the first yoke 4 and extends in the radial direction of the first yoke 4. The heights of the first teeth 51 to 56 have line symmetry with respect to the first reference straight line is serving as the axis of symmetry. More specifically, the protrusion heights of the first teeth 51 to 56 may be expressed as protrusion height of first tooth 51>protrusion height of first tooth 52, 56>protrusion height of first tooth 53, 55>protrusion height of first tooth 54. The difference between the protrusion height of the first tooth 52 and the protrusion height of the first tooth 56 is 0.02 mm or less, and the first tooth 52 and the first tooth 56 may be considered to have substantially the same protrusion height. The difference between the protrusion height of the first tooth 53 and the protrusion height of the first tooth 55 is 0.02 mm or less, and the first tooth 53 and the first tooth 55 may be considered to have substantially the same protrusion height. Here, as illustrated in FIG. 7, the first teeth 51 to 56 each has a protrusion height $h_t$ that is the length of a straight line extending vertically from a virtual plane that includes the first yoke surface 40 to the centroid of area of the end surface of the first tooth. The protrusion heights $h_t$ of the first teeth 51 to 56 can be measured by using, for example, a Wide-Area 3D Measurement System VR-5000 manufactured by Keyence Corporation. The protrusion height $h_t$ of each of the first teeth 51 to 56 is calculated by a height profile passing through the centroid of area of the end surface of the first teeth. An entire height $h_c$, which will be described later, can be measured in a similar manner.

The first reference straight line is can be determined by measuring the protrusion heights $h_t$ of the first teeth 51 to 56 and obtaining the line symmetry of the protrusion heights $h_t$. By providing a first mark 15 (FIG. 3) that indicates the position of the first reference straight line is on the first core 10, the effort and time needed for the measurement of the protrusion heights $h_t$ may be reduced. The first mark 15 of the present embodiment indicates the side on which the powder supply operation is started when the first core 10 is fabricated. Thus, in the present embodiment, the first mark 15 is provided between the first tooth 51, which is the tooth having the largest protrusion height $h_t$, and an end portion of the first yoke 4. More specifically, the first mark 15 is provided at a position on a straight line connecting the centroid of area of the first tooth 51 and the axis of the first yoke 4 and between the end portion of the first yoke 4 that is closest to the first tooth 51 and the first tooth 51. The first mark 15 indicates the tooth having the largest protrusion height $h_t$ and is a reference in the circumferential direction of the first yoke 4. Unlike the present embodiment, the first mark 15 may indicate the side on which the powder feeding machine 8 (FIG. 5 and FIG. 6) starts moving backward. In this case, the first mark 15 indicates the tooth having the smallest protrusion height $h_t$ and is a reference in the circumferential direction of the first yoke 4. In other words, the first mark 15 indicates the tooth having the largest protrusion height $h_t$ or the tooth having the smallest protrusion height $h_t$. This is common to a second mark 25, which will be described later. The first mark 15 can be formed of a concave portion or a convex portion that is formed in or on the first core 10. In this case, a convex portion or a concave portion may be formed beforehand in or on the die 9 (FIG. 5). It is preferable that the first mark 15 be provided at a position where it does not adversely affect the magnetic characteristics of the first core 10. The first mark 15 can also be formed of a paint, a sticker, or the like. In this case, the first mark 15 does not adversely affect the magnetic characteristics of the first core 10.

Although the dimensions of the portions of the first core 10, which is formed of a dust core, are likely to vary, it is preferable that the variation among the dimensions of the portions be small. For example, as illustrated in FIG. 7, it is preferable that the variation among the entire heights $h_c$ of the first teeth 51 to 56 be 0.05 mm to 0.15 mm, the entire height $h_c$ being the distance from a surface that is opposite to the first yoke surface 40 to the end surface of each of the first teeth 51 to 56 in the first core 10. The entire height $h_c$ is the length of a straight line extending vertically from the bottom surface of the first yoke 4 to the centroid of area of the end surface of the first tooth 5. In the case of the present embodiment, six entire heights $h_c$ are obtained at the positions of the first teeth 51 to 56. In other words, it is preferable that the difference between the largest entire height $h_c$ and the smallest entire height $h_c$ be 0.05 mm to 0.15 mm. It is preferable that the variation among the entire heights $h_c$ be 0.13 mm or less, or more preferably, 0.10 mm or less.

It is preferable that the variation among thicknesses t of the first yoke 4 be 0.03 mm to 0.10 mm. One of the thicknesses t is a thickness at a center position between the two first teeth 51 and 52 that are adjacent to each other in the circumferential direction. In the case of the present embodiment, six thicknesses t, the number of the thicknesses t being equal to the number of the first teeth 5, are measured, and it is preferable that the difference between the largest thickness t and the smallest thickness t be 0.03 mm to 0.10 mm. It is preferable that the variation among the thicknesses t be 0.09 mm or less, or more preferably, 0.08 mm or less.

It is preferable that the variation among the protrusion heights $h_r$ of the first teeth 51 to 56 be 0.03 mm to 0.10 mm. In the case of the present embodiment, six protrusion heights $h_r$ are obtained, and thus, it is preferable that the difference between the largest protrusion height $h_r$ and the smallest protrusion height $h_r$ be 0.03 mm to 0.10 mm. It is preferable that the variation among the protrusion heights $h_r$ be 0.09 mm or less, or more preferably, 0.08 mm or less.

Second Stator

Figure 4:
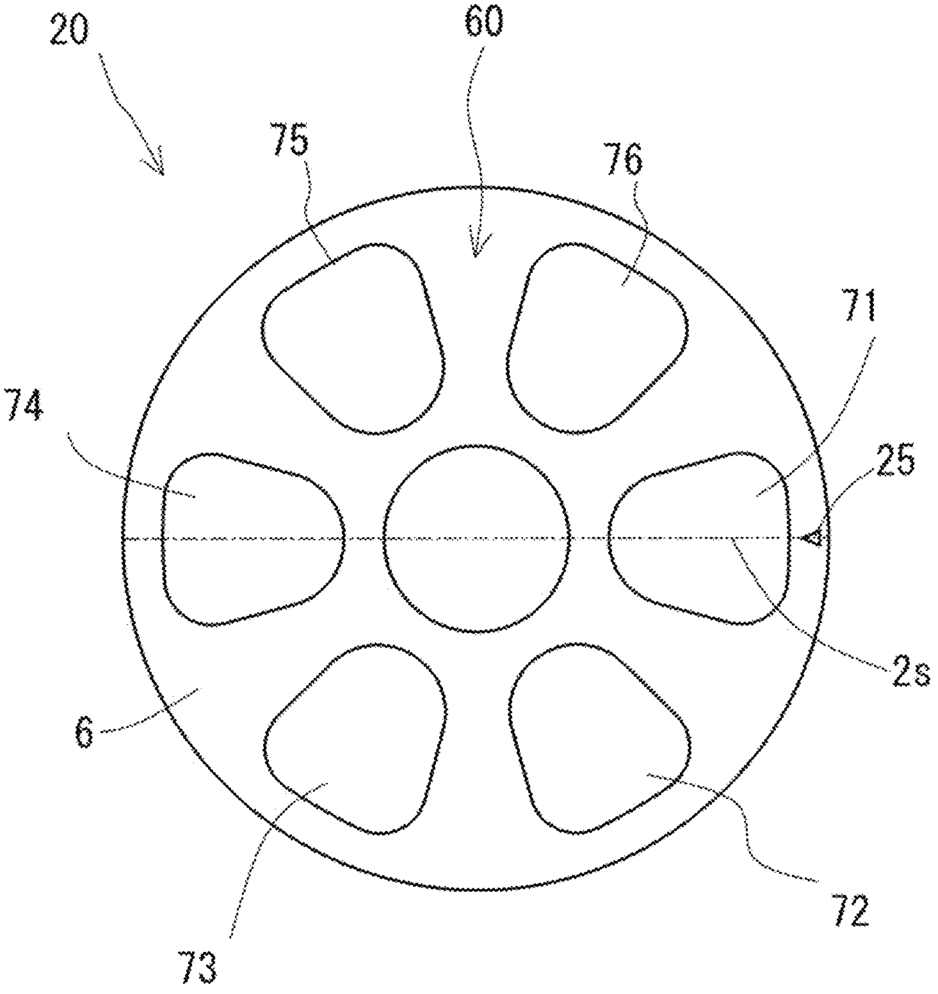
FIG. 4 is a top view of a second core of a second stator.

As illustrated in FIG. 1, the second stator 2 includes a second core 20 and second coils 21. As illustrated in FIG. 4, the second core 20 includes a second yoke 6 that has an annular shape and the plurality of second teeth 71 to 76 each of which protrudes from a second yoke surface 60 of the second yoke 6. The second core 20 is fabricated by using the same die 9 (FIG. 5, FIG. 6) as that used for fabricating the first core 10. The second yoke 6, the second yoke surface 60, and the second teeth 71 to 76 are the same as the first yoke 4, the first yoke surface 40, and the first teeth 51 to 56 of the first core 10 illustrated in FIG. 2 and FIG. 3. In addition, as illustrated in FIG. 4, a second reference straight line 2*s* and the second mark 25 that indicates the position of the second reference straight line 2*s* are the same as the first reference straight line is and the first mark 15, which indicates the position of the first reference straight line is, of the first core 10. In other words, in the present embodiment, the second mark 25 is provided between the second tooth 71, which is the tooth having the largest protrusion height $h_r$, and an end portion of the second yoke 6. More specifically, the second mark 25 is provided at a position on a straight line connecting the centroid of area of the second tooth 71 and the axis of the second yoke 6 and between the end portion of the second yoke 6 that is closest to the second tooth 71 and the second tooth 71. Description of each portion of the second core 20 will be omitted.

<<Arrangement of First Core and Second Core>>

In the case where the first core 10 (FIG. 3) and the second core 20 (FIG. 4) that have line symmetry are combined together, when viewed in the direction in which the rotary shaft of the rotor 3 extends (the axial direction of the shaft 30 illustrated in FIG. 1), the first mark 15 of the first core 10 and the second mark 25 of the second core 20 are symmetrically positioned with respect to the rotary shaft. As a result of the first mark 15 and the second mark 25 being symmetrically positioned, the first reference straight line is and the second reference straight line 2*s* coincide with each other. In FIG. 7, the heights of the first teeth 51 to 54 and the heights of the second teeth 71 to 79 are exaggeratedly illustrated. In addition, the distance by which the first core 10 and the rotor 3 are spaced apart from each other and the distance by which the second core 20 and the rotor 3 are spaced apart from each other are each illustrated to be larger than the actual distance.

As illustrated in FIG. 7, when the first core 10 and the second core 20 are positioned such that the teeth of the first core 10 face the teeth of the second core 20, a pair of teeth that are the first tooth 51 and the second tooth 74 facing each other in the direction in which the rotary shaft extends (the direction connecting the centers of the first yoke 4, the rotor 3, and the second yoke 6) can be obtained. In other words, as a result of the first mark 15 and the second mark 25 being symmetrically positioned, the highest first tooth 51 of the first core 10 and the lowest second tooth 74 of the second core 20 face each other. In addition, a pair of teeth that are the first tooth 52 and the second tooth 73, a pair of teeth that are the first tooth 53 and the second tooth 72, and a pair of teeth that are the first tooth 54 and the second tooth 71 are obtained. Although not illustrated in FIG. 7, a pair of teeth that are the first tooth 55 and the second tooth 76 and a pair of teeth that are the first tooth 56 and the second tooth 75 are obtained. As mentioned above, the heights of the teeth may be expressed as tooth 51, 71>tooth 52, 56, 72, 76>tooth 53, 55, 73, 75>tooth 54, 74. Thus, each pair of teeth is the combination of the highest tooth and the lowest tooth or the combination of the second highest tooth and the second lowest tooth.

The variation among intertooth distances L in the pairs of teeth is 0.08 mm or less. Each of the intertooth distances L is the distance between the centroid of area of the end surface of the first tooth and the centroid of area of the end surface of the second tooth in one of the pairs of teeth. In other words, the intertooth distance L is obtained for each of the pairs of teeth. When the variation among the intertooth distances L is 0.08 mm or less, the difference between the largest intertooth distance L and the smallest intertooth distance L is 0.08 mm or less. In the present embodiment, the core 10 and the core 20 are combined together by taking into consideration the differences in height among the teeth of the cores 10 and 20. Thus, the difference between the largest intertooth distance L and the smallest intertooth distance L becomes 0.08 mm or less. It is preferable that the difference be as small as possible. For example, it is preferable that the difference be 0.06 mm or less, or more preferably, 0.04 mm or less. The difference is most preferably zero.

Advantageous Effects of Present Embodiment

The rotary electric machine 100 of the present embodiment has a favorable productivity. This is because the first core 10 and the second core 20 of the rotary electric machine 100 are each a dust core including a yoke and teeth that are integrally formed into one member, so that the effort and time needed for combining the yoke and the teeth can be reduced.

The rotary electric machine 100 of the present embodiment has a favorable energy efficiency. In the rotary electric machine 100 of the present embodiment, the intertooth distances L in all the pairs of teeth are approximately equal to one another, and thus, the variation among the torques that are generated by the pairs of teeth at the respective positions in the circumferential direction of the rotor 3 is small. In other words, the torque ripple in the rotary electric machine 100 is reduced. Thus, a magnetic energy loss in the rotary electric machine 100 is less likely to increase. In addition, since the torque ripple in the rotary electric machine 100 is small, the rotary shaft (the shaft 30) of the rotor 3 is less likely to swing. In other words, the frictional force generated between the shaft 30 and a bearing 33 is less likely to fluctuate. Therefore, a mechanical energy loss in the rotary electric machine 100 is less likely to increase.

Other Requirements

The energy efficiency of the rotary electric machine 100 can be improved by satisfying the requirements listed below.

The variation among the entire heights $h_c$ in the first core 10 illustrated in FIG. 7 is 20% or less of the average value of the distances between the first teeth 51 to 56 (FIG. 3) and the first rotor surface 3A. The number of the above distances measured is the same as the number of the first teeth 51 to 56. In addition, the variation among the entire heights $h_c$ in the second core 20 is 20% or less of the average value of the distances between the second teeth 71 to 76 (FIG. 4) and a second rotor surface 3B. The number of the above distances measured is the same as the number of the second teeth 71 to 76.

The variation among the thicknesses t of the first yoke 4 is 2% or less of the average value of the distances between portions of the first yoke surface 40 and the first rotor surface 3A. This average value is the average value of the lengths of straight lines extending orthogonally from the positions at which the thicknesses t of the first yoke 4 are measured to the first rotor surface 3A. The number of measurements performed is the same as the number of measurements performed when the variation among the thicknesses t is determined, that is, the same as the number of the first teeth 5. The variation among thicknesses of the second yoke 6 is set to 2% or less of the average value of the distances between portions of the second yoke surface 60 and the second rotor surface 3B. This average value is the average value of the lengths of straight lines extending orthogonally from the positions at which the thicknesses t of the second yoke 6 are measured to the second rotor surface 3B.

Upon energization, an annular magnetic circuit that passes through the first core 10, the rotor 3, and the second core 20 is formed. The variation among the entire heights $h_c$ in the first core 10 is set to 1% or less of the magnetic circuit length of the annular magnetic circuit. In addition, the variation among the entire heights $h_c$ in the second core 20 is set to 1% or less of the magnetic circuit length of the annular magnetic circuit (see a two-dot chain line in FIG. 7).

Here, the annular magnetic circuit in the present embodiment is a virtually-calculated annular magnetic circuit that is formed when a coil is energized (see the two-dot chain line in FIG. 7). For example, an annular magnetic circuit that passes through the U-phase first teeth 51 and 54 and the U-phase second teeth 71 and 74 is formed. The annular magnetic circuit connects a first magnetic circuit line, a second magnetic circuit line, a third magnetic circuit line, and a fourth magnetic circuit line. The first magnetic circuit line is a straight line that passes through the centroid of area of the end surface of the first teeth 51 and the centroid of area of the end surface of the second teeth 74 and extends through the first teeth 51, the second teeth 74, and the rotor 3. The second magnetic circuit line is a straight line that passes through the centroid of area of the end surface of the first teeth 54 and the centroid of area of the end surface of the second teeth 71 and extends through the first teeth 54, the second teeth 71, and the rotor 3. The third magnetic circuit line is a curve that is on a plane dividing the first yoke into two portions in a thickness direction and that has an arc shape so as to connect the first magnetic circuit line and the second magnetic circuit line. The fourth magnetic circuit line is a curve that is on a plane dividing the second yoke into two portions in a thickness direction and that has an arc shape so as to connect the first magnetic circuit line and the second magnetic circuit line.

Test Example

In a test example, how much influence the way in which a first stator and a second stator are combined has on the torque of a motor and the loss in the motor was determined by simulation. The following two samples were examined.

Sample No. 1

A rotary electric machine that is a sample No. 1 is a 3-phase, 10-pole, 12-slot double stator-type rotary electric machine. A first core and a second core that are included in the rotary electric machine each include 12 teeth. In the first core, when the tooth that has the largest protrusion height is disposed at a 12 o'clock position, a first mark is provided between the tooth at the 12 o'clock position and a yoke. Similarly, in the second core, a second mark is provided between the tooth at a 12 o'clock position and a yoke. The relationship among the protrusion heights of the 12 teeth is as follows.

Tooth at 12 o'clock position>tooth at 1 o'clock position, tooth at 11 o'clock position>tooth at 2 o'clock position, tooth at 10 o'clock position>tooth at 3 o'clock position, tooth at 9 o'clock position>tooth at 4 o'clock position, tooth at 8 o'clock position>tooth at 5 o'clock position, tooth at 7 o'clock position>tooth at 6 o'clock position In the sample No. 1, the first mark and the second mark were symmetrically positioned with respect to a rotary shaft. In other words, the first tooth of the first core located at the 12 o'clock position and the second tooth of the second core located at a 6 o'clock position were arranged so as to face each other. In this configuration, the difference between the largest intertooth distance L and the smallest intertooth distance L was 0.05 mm. Other requirements are as follows.

- Outer diameter of yoke: 56 mm, inner diameter of yoke: 20 mm
- Cross-sectional area of tooth: 60 $mm^2$
- Number of turns of coil: 43 turns
- Variation among entire heights $h_c$: 0.14 mm
- Variation among thicknesses t of yoke: 0.05 mm
- Variation among protrusion heights $h_t$ of teeth: 0.09 mm
- Average distance between teeth and rotor surface: 1.0 mm
- Percentage of variation among entire heights $h_c$ with respect to average distance between teeth and rotor surface: 14%
- Percentage of variation among thicknesses t of yoke with respect to average distance between yoke surface and rotor surface: 0.8%
- Percentage of variation among entire heights $h_c$ with respect to magnetic circuit length: 0.2%
- Rotational speed of rotor: 2,000 rpm
- Current density: 2.33 Arms

Sample No. 2

A rotary electric machine that is a sample No. 2 is a double stator-type rotary electric machine that uses the first core and the second core used in the sample No. 1. However, the first mark and the second mark were arranged at the same position with respect to a rotary shaft. In other words, one of the first teeth of the first core that is located at the 12 o'clock position and one of the second teeth of the second core that is located at the 12 o'clock position were arranged so as to face each other. This configuration is, so to speak, a configuration in which the intertooth distance gradually increases from the 12 o'clock position toward the 6 o'clock position.

Test Results

Figure 8:
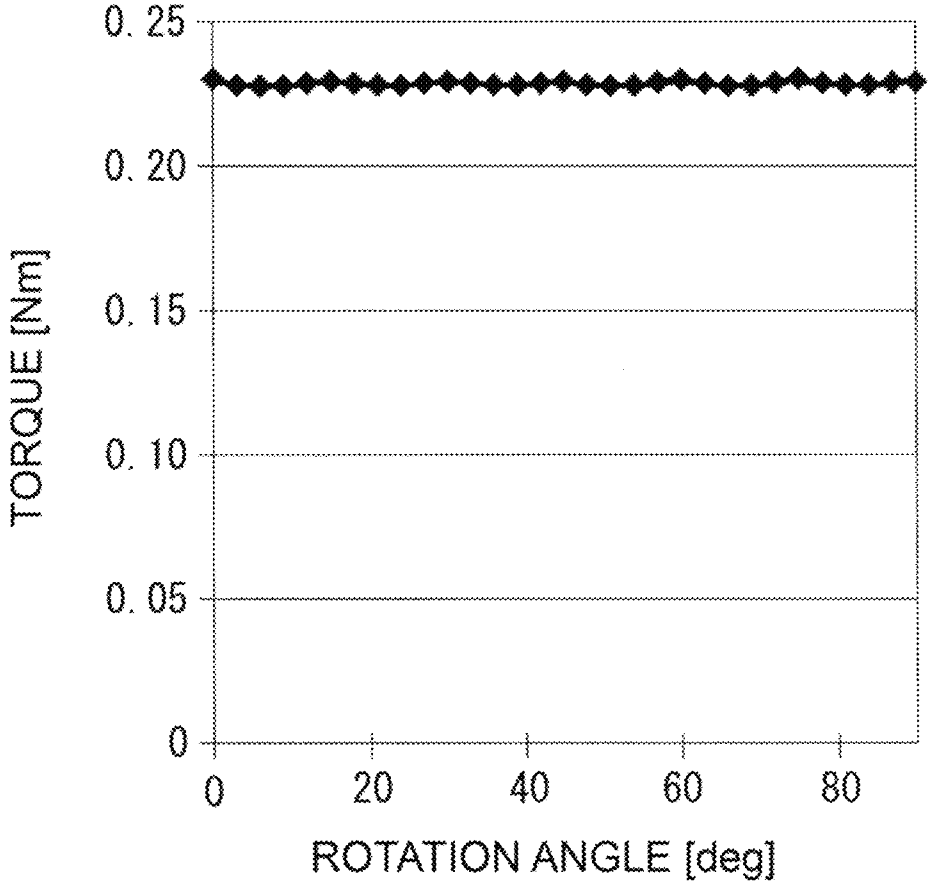
FIG. 8 is a graph illustrating a torque ripple in a sample No. 1 described in a test example.
Figure 9:
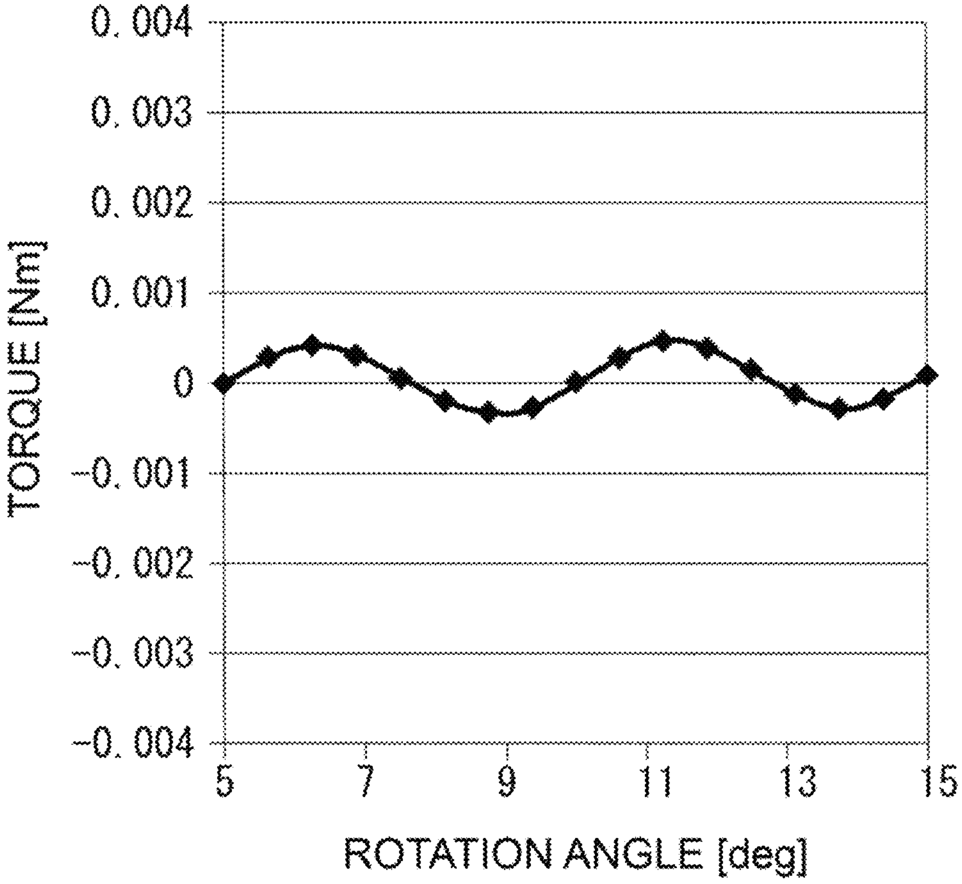
FIG. 9 is a graph illustrating a cogging torque in the sample No. 1 described in the test example.

Results of a test for a torque ripple in the sample No. 1 are illustrated in FIG. 8, and results of a test for a cogging torque in the sample No. 1 are illustrated in FIG. 9. In FIGS. 8 and 9, the horizontal axis denotes the rotation angle (degree) of the rotor, and the vertical axis denotes the torque (N m). As illustrated in FIG. 8, in the sample No. 1, the average torque value was 0.23 N m, and the torque ripple was 1.3% of the average torque value. In addition, as illustrated in FIG. 9, the amplitude of the cogging torque in the sample No. 1 was 0.00095 N·m.

The energy efficiency of the sample No. 1 was determined by calculation. As a result, in the sample No. 1, the electromagnetic energy efficiency was 66.2%, and the energy efficiency including a mechanical loss was 66.0%. Each energy efficiency is the ratio of power energy obtained from the motor to the electrical power energy input to the motor.

Figure 10:
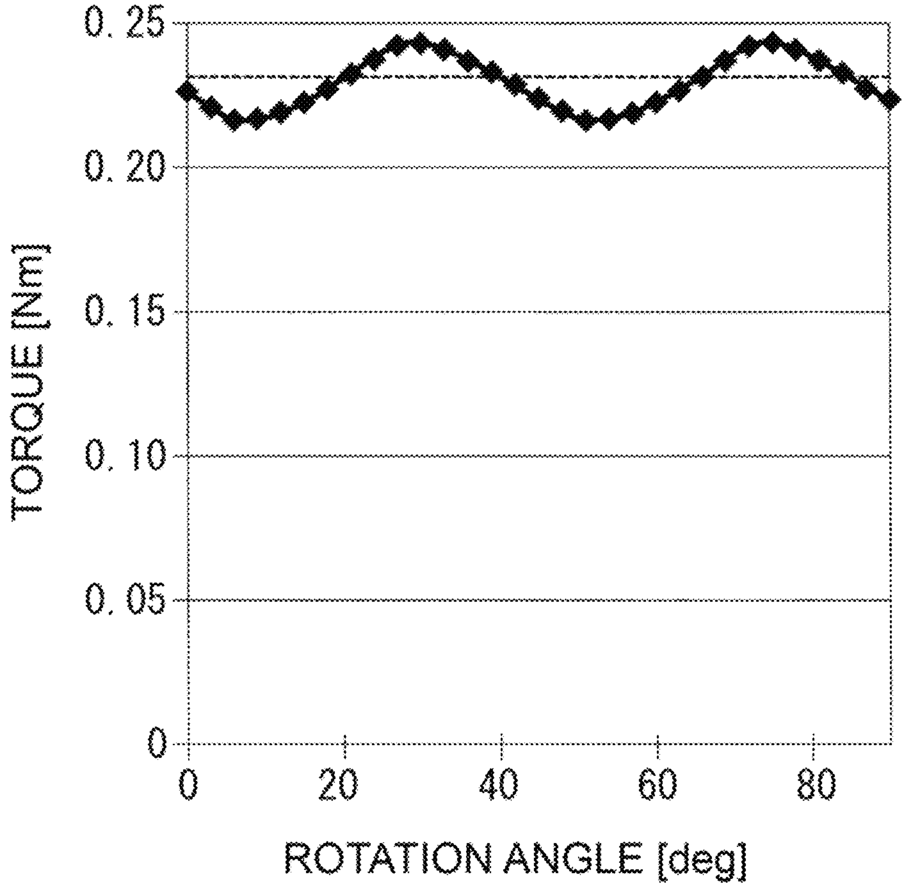
FIG. 10 is a graph illustrating a torque ripple in a sample No. 2 described in the test example.
Figure 11:
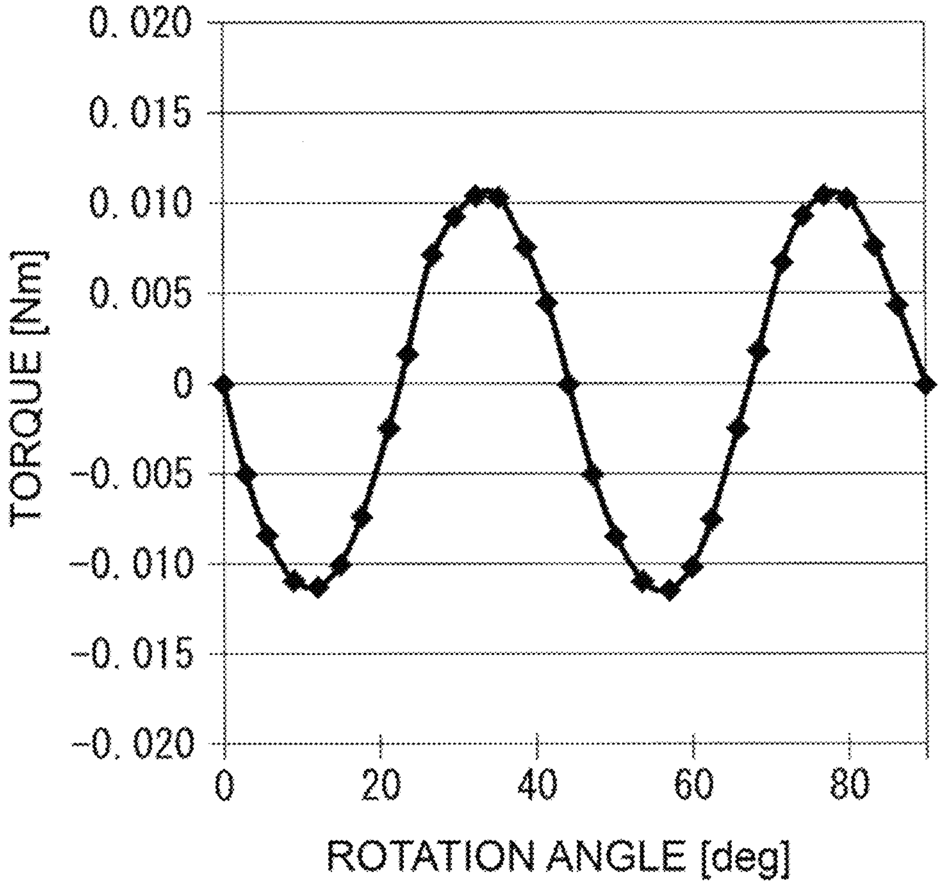
FIG. 11 is a graph illustrating a cogging torque in the sample No. 2 described in the test example.

Results of a test for a torque ripple in the sample No. 2 are illustrated in FIG. 10, and results of a test for a cogging torque in the sample No. 2 are illustrated in FIG. 11. FIG. 10 and FIG. 11 illustrate the results in the same way as FIG. 8 and FIG. 9. As illustrated in FIG. 10, in the sample No. 2, the average torque value was 0.23 N m, and the torque ripple was 2.7% of the average torque value. In addition, as illustrated in FIG. 11, the amplitude of the cogging torque in the sample No. 2 was 0.022 N m. With the configuration of the sample No. 2, the intertooth distance is narrow at some positions and wide at other positions in the circumferential direction of the rotor. In such a configuration, the variation among the torques that are generated by the pairs of teeth at the respective positions in the circumferential direction of the rotor is large. Thus, it is presumed that the torque ripple and the cogging torque in the sample No. 2 become large.

The energy efficiency of the sample No. 2 was determined by calculation. As a result, in the sample No. 2, the electromagnetic energy efficiency was 66.2%, and the energy efficiency including a mechanical loss was 59.3%.

It was found from the above-mentioned results that noise and vibration that are generated in the rotary electric machine are reduced by reducing the variation among intertooth distances in the pairs of teeth. In addition, it was found that the energy efficiency of the rotary electric machine can be improved by reducing the variation among intertooth distances in the pairs of teeth.

REFERENCE SIGNS LIST

100 rotary electric machine
101 housing
1 first stator
10 first core
11 first coil
15 first mark
2 second stator
20 second core
21 second coil
25 second mark
3 rotor
3A first rotor surface
3B second rotor surface
30 shaft
31 holding plate
32 magnet
33 bearing
4 first yoke
40 first yoke surface
5, 51, 52, 53, 54, 55, 56 first tooth
6 second yoke
60 second yoke surface
7, 71, 72, 73, 74, 75, 76 second tooth
8 powder feeding machine
8*d* magnetic powder
8*s* powder feeding axis
80 powder feed port
9 die
90 yoke forming portion
91, 92, 93, 94, 95, 96 tooth forming portion

The invention claimed is:

1. An axial gap-type rotary electric machine in which a first stator, a second stator, and a rotor are arranged in a direction in which a rotary shaft of the rotor extends,
- wherein the first stator includes a first coil and a first core formed of a dust core, the first coil being disposed on the first core,
- wherein the second stator includes a second coil and a second core formed of a dust core, the second coil being disposed on the second core,
- wherein the first core includes
  - an annular first yoke having a first yoke surface,
  - a plurality of first teeth each protruding from the first yoke surface, and
  - a first mark formed on the first yoke surface and indicating a reference position in a circumferential direction of the first yoke, the first mark being the only mark of the first core indicating the reference position in a circumferential direction of the first yoke,
- wherein the second core includes
  - an annular second yoke having a second yoke surface, the second yoke surface facing the first yoke surface,
  - a plurality of second teeth each protruding from the second yoke surface, and
  - a second mark formed on the second yoke surface and indicating a reference position in a circumferential direction of the second yoke, the second mark being the only mark of the second core indicating a reference position in a circumferential direction of the second yoke,
- wherein the first stator and the second stator are positioned such that the first teeth face the second teeth,
- wherein the first core and the second core have a same shape fabricated by a same productive equipment,
- wherein a position of the first mark in the first core and a position of the second mark in the second core correspond to a same position in a circumferential direction of the productive equipment,
- wherein the first mark does not overlap the second mark when viewed in an axial direction,
- wherein when a virtual first reference straight line passing through the axis of the first yoke, when viewed in the axial direction, is drawn on the first yoke,
- wherein when a virtual second reference straight line passing through the axis of the second yoke, when viewed in the axial direction, is drawn on the second yoke,
- the first reference straight line is a straight line such that a tooth and another tooth of the first core at positions that are symmetrical with respect to the first reference straight line have substantially the same protrusion height,
- wherein the second reference straight line is a straight line such that a tooth and another tooth in the second core at positions that are symmetrical with respect to the second reference straight line have substantially the same height, and wherein the first reference straight line and the second reference straight line coincide with each other when viewed in the axial direction.

2. The rotary electric machine according to claim 1, wherein a highest tooth of the first core and the lowest tooth of the second core are arranged to face each other.

3. The rotary electric machine according to claim 1, wherein a difference between a protrusion height of one of the plurality of first teeth and a protrusion height of another one of the plurality of first teeth, the one first tooth and the other first tooth being symmetrically positioned with respect to the first reference straight line, and each protrusion height being from the first yoke surface to an end surface of the corresponding first tooth, is 0.15 mm or less, and a difference between a protrusion height of one of the plurality of second teeth and a protrusion height of another one of the plurality of second teeth, the one second tooth and the other second tooth being symmetrically positioned with respect to the second reference straight line, and each protrusion height being from the second yoke surface to an end surface of the corresponding second tooth, is 0.15 mm or less.

4. The rotary electric machine according to claim 1, wherein the first teeth and the second teeth form a plurality of pairs of teeth in such a manner that each of the pair of teeth is formed of one of the first teeth and one of the second teeth arranged at positions facing each other in the direction in which a rotary shaft extends, and wherein, when a distance from a centroid of area of the end surface of the first tooth to a centroid of area of the end surface of the second tooth in each of the plurality of pairs of teeth is referred to as an intertooth distance, a difference between the largest intertooth distance and the smallest intertooth distance is 0.08 mm or less.

5. The rotary electric machine according to claim 4, wherein the difference between the largest intertooth distance and the smallest intertooth distance is 0.06 mm or less.

6. The rotary electric machine according to claim 1, wherein, in the first core, a variation among entire heights of the plurality of first teeth, each of the entire heights being a distance from a surface opposite to the first yoke surface to the end surface of the corresponding first teeth, is 0.05 mm to 0.15 mm, and wherein, in the second core, a variation among entire heights of the plurality of second teeth, each of the entire heights being a distance from a surface opposite to the second yoke surface to the end surface of the corresponding second teeth, is 0.05 mm to 0.15 mm.

7. The rotary electric machine according to claim 1, wherein a variation among thicknesses is 0.03 mm to 0.10 mm, and wherein a variation among thicknesses of the second yoke is 0.03 mm to 0.10 mm.

8. The rotary electric machine according to claim 1, wherein a variation among protrusion heights of the plurality of first teeth is 0.03 mm to 0.10 mm, and wherein a variation among protrusion heights of the plurality of second teeth is 0.03 mm to 0.10 mm.

9. The rotary electric machine according to claim 8, wherein the variation among the protrusion heights of the plurality of first teeth is 0.09 mm or less, and wherein the variation among the protrusion heights of the plurality of second teeth is 0.09 mm or less.

10. The rotary electric machine according to claim 1, wherein the rotor has a first rotor surface facing the end surfaces of the first teeth and a second rotor surface facing the end surfaces of the second teeth, wherein the variation among the entire heights of the plurality of first teeth, each of the entire heights being the distance from the surface opposite to the first yoke surface to the end surface of the corresponding first teeth, is 20% or less of an average value of distances between the plurality of first teeth and the first rotor surface, and wherein the variation among the entire heights of the plurality of second teeth, each of the entire heights being the distance from the surface opposite to the second yoke surface to the end surface of the corresponding second teeth, is 20% or less of an average value of distances between the plurality of second teeth and the second rotor surface.

11. The rotary electric machine according to claim 1, wherein the rotor has a first rotor surface facing the end surfaces of the first teeth and a second rotor surface facing the end surfaces of the second teeth, wherein the variation among thicknesses is 2% or less of an average value of distances between the first yoke surface and the first rotor surface, and wherein the variation among thicknesses of the second yoke is 2% or less of an average value of distances between the second yoke surface and the second rotor surface.

12. The rotary electric machine according to claim 1, wherein, upon energization, an annular magnetic circuit that passes through the first core, the rotor, and the second core is formed, wherein the variation among the entire heights of the plurality of first teeth, each of the entire heights being the distance from the surface opposite to the first yoke surface to the end surface of the corresponding first teeth, is 1% or less of a magnetic circuit length of the annular magnetic circuit, and wherein the variation among the entire heights of the plurality of second teeth, each of the entire heights being the distance from the surface opposite to the second yoke surface to the end surface of the corresponding second teeth, is 1% or less of the magnetic circuit length of the annular magnetic circuit.

13. The rotary electric machine according to claim 1, wherein the first mark indicates one tooth of the plurality of first teeth having a largest protrusion height or a smallest protrusion height, and wherein the second mark indicates one tooth of the plurality of second teeth having a largest protrusion height or a smallest protrusion height.

14. The rotary electric machine according to claim 13, wherein the first mark of the first core and the second mark of the second core are symmetrically positioned with respect to the rotary shaft when viewed in the axial direction.

15. The rotary electric machine according to claim 14, wherein the first mark is provided between an end portion of the first yoke that is closest to the first tooth indicated by the first mark and the first tooth indicated by the first mark, and wherein the second mark is provided between an end portion of the second yoke that is closest to the second tooth indicated by the second mark and the second tooth indicated by the second mark.

16. The rotary electric machine according to claim 1, wherein the first mark and the second mark are each formed of a concave portion or a convex portion.

17. The rotary electric machine according to claim 1, wherein the first mark and the second mark are each formed of a paint or a sticker.

18. The rotary electric machine according to claim 1, wherein the dust core of the first core and the dust core of the second core each comprise magnetic particles formed of at least one type of powder selected from the group consisting of pure iron, an Fe—Si—Al alloy, an Fe—Si alloy, an Fe—Al alloy, and an Fe—Ni alloy.

19. The rotary electric machine according to claim 18, wherein the magnetic particles have an insulating coating on their surfaces, the insulating coating comprising a phosphate coating or a silica coating.

20. The rotary electric machine according to claim 1, wherein the first mark is provided at a position on a straight line connecting a centroid of area of an end surface of the first tooth indicated by the first mark and the axis of the first yoke, and wherein the second mark is provided at a position on a straight line connecting a centroid of area of an end surface of the second tooth indicated by the second mark and the axis of the second yoke.

* * * * *